US012121491B2

(12) United States Patent
Khademhosseini

(10) Patent No.: US 12,121,491 B2
(45) Date of Patent: Oct. 22, 2024

(54) CRUTCH AND SITTING DEVICE

(71) Applicant: Nami Khademhosseini, Falls Church, VA (US)

(72) Inventor: Nami Khademhosseini, Falls Church, VA (US)

( * ) Notice: Subject to any disclaimer, the term of this patent is extended or adjusted under 35 U.S.C. 154(b) by 194 days.

(21) Appl. No.: 17/856,985

(22) Filed: Jul. 2, 2022

(65) Prior Publication Data

US 2022/0370281 A1 Nov. 24, 2022

Related U.S. Application Data

(63) Continuation-in-part of application No. 16/405,980, filed on May 7, 2019, now abandoned.

(51) Int. Cl.
*A61H 3/02* (2006.01)

(52) U.S. Cl.
CPC ....... *A61H 3/02* (2013.01); *A61H 2201/1635* (2013.01)

(58) Field of Classification Search
CPC .......................... A61H 2201/1635; A61H 3/02
See application file for complete search history.

(56) References Cited

U.S. PATENT DOCUMENTS 3,269,399 A * 8/1966 Smith ...................... A61H 3/02 401/6
3,517,678 A * 6/1970 Gilsdorf ................... A61H 3/02 16/DIG. 12
4,625,743 A * 12/1986 Harker ..................... A61H 3/02 135/72
5,025,820 A * 6/1991 Gamper ................... A61H 3/02 135/69
6,988,295 B2 * 1/2006 Tillim ...................... G05G 1/06 16/110.1
7,487,788 B2 * 2/2009 Baker ...................... A61H 3/02 135/69
7,537,017 B2 * 5/2009 Baker ...................... A61H 3/02 135/71
9,032,982 B2 * 5/2015 Summit ................ H04M 1/724 135/69
9,358,176 B1 * 6/2016 Vaeth ....................... A61H 3/02
9,532,917 B2 * 1/2017 Summit ................ A61F 5/0118
9,918,893 B1 * 3/2018 Wanderman ............. A61H 3/02

(Continued)

FOREIGN PATENT DOCUMENTS

GB 2155785 A * 10/1985 ............... A45B 9/02

*Primary Examiner* — David R Dunn
*Assistant Examiner* — Danielle Jackson
(74) *Attorney, Agent, or Firm* — Michael Razavi; Alfred F. Hoyte, Jr.; IP Consulting Group

(57) ABSTRACT

Devices for improvement of the basic crutch, cane, and ambulatory aids to provide needed support to ameliorate potential injuries and improve ambulation for persons suffering from injured lower limbs, lumbar region or other injuries, and who frequently require using crutches for mobility. Normally, the conventional crutches require more energy from the user than merely walking, and frequently, a crutch user may require rest. Prior crutch systems have not provided a convenient way to provide the user with such rest. Also, we show crutch support in sitting position that works as a simple and handy decompression system for herniated or bulged discs and injured/weak back muscles. An integrated crutch and walker system is described.

10 Claims, 16 Drawing Sheets

(56) References Cited

U.S. PATENT DOCUMENTS

| | | | | |
|---|---|---|---|---|
| 10,278,887 | B2 * | 5/2019 | Khademhosseini | A61H 3/02 |
| 10,603,243 | B2 * | 3/2020 | Scott | A61H 3/02 |
| 2002/0020438 | A1 * | 2/2002 | Best | A61H 3/02 135/69 |
| 2008/0173340 | A1 * | 7/2008 | Robbins | A61H 3/02 135/72 |
| 2013/0146111 | A1 * | 6/2013 | Gelfand | A61H 3/02 135/71 |
| 2013/0263901 | A1 * | 10/2013 | Severson | A61H 3/02 135/72 |
| 2017/0319423 | A1 * | 11/2017 | Khademhosseini | A61H 3/0277 |
| 2018/0133093 | A1 * | 5/2018 | Khademhosseini | A61H 3/02 |
| 2019/0110944 | A1 * | 4/2019 | Wanderman | A61H 3/02 |

* cited by examiner

CRUTCH AND SITTING DEVICE

CROSS REFERENCE TO RELATED APPLICATION

This application is a CIP of application Ser. No. 16/405,980 filed on May 7, 2019, which is a CIP of application Ser. No. 15/849,631 filed on Apr. 17, 2019, which is a CIP of application Ser. No. 14/641,313, filed on Mar. 7, 2015. We claim priority on the above filing date. We incorporate by reference all the teachings of the above applications in this application.

BACKGROUND OF THE INVENTION

Reduced or inhibited mobility presents a significant problem for many people. Whether it is an injury to the leg, hip, wrist, lumbar, or the result of increased age, mechanical devices are often used for assisting the user to enhance their mobility. Canes, crutches, walking sticks and various other devices have been in use for a considerable time. However, the functional design of these devices has remained substantially the same. Unfortunately, for the user, these devices are often cumbersome, uncomfortable, and difficult to use in slippery surface situations and do not support the user's back adequately in the standing or seated position.

Persons suffering from injured lower limbs are frequently required to use crutches for mobility. However, crutches require more energy from the user than merely walking, and frequently, a crutch user may require rest. Prior crutch systems have not provided a convenient way to provide the user with such rest, and correct positioning for wrists, which necessitate support to the back and lower lumbar region. This support is important to the crutch user in both the standing and seated position.

It would also be advantageous for a crutch, or similarly constructed walking aid, to provide greater comfort for the user. It would be further advantageous for the walking aid to utilize the user's energy to mechanically assist the user, while walking. Furthermore, it would be advantageous for a walking aid to provide enhanced grip on slippery and/or uneven surfaces. It also would be advantageous for walking aid to provide an ergonomic handle that provide a correct hand rest and wrist positioning.

While various modifications have been attempted, there is presently no crutch that incorporates the appropriate ergonomic structure in a light-weight, sure gripping, user friendly, shock absorbing, ergonomic handle, and collapsible format. Now, we introduce different embodiments of our inventions:

The current invention is designed to ameliorate many health problems caused and exacerbated by the classic crutch design and provide the light-weight, sure gripping, user friendly, shock absorbing, ergonomic handle, and collapsible format that users need. This current invention is also designed to provide the support to the back a crutch user requires in both the standing and seated positions.

The injuries resulting from the traditional crutch use are in part due to the fact that patients overly rely upon the underarm portion to support the body weight. The invention here is designed to take considerable pressure from the underarm portion and support the body weight of the user ergonomically. This crutch is designed for the contour of the shape of the axilla. This minimizes potential underarm nerve injuries, like neuropraxia, and even complete paralysis of the arm. The design also ensures that the pressing weight of the body is not solely directly on the axilla, thus, minimizing the occurrence of muscle strain of the arms and shoulders, as well as joint pain to the shoulders.

Additionally, this improved crutch design minimizes and reduces injuries to the hand and wrist. The hand grip is contoured to fit a patient's palm, designed to maintain the hand and wrist in a neutral position, when the crutches are in use or at a e.g. 5 to 25 degree angle during ambulation. The general construction and design of existing crutch hand grips does not provide the correct ergonomic orientation between the wrist and forearm, even though padding may be present. Failure to achieve correct alignment and padding in the palmar area can result in disorders of wear and tear, including overuse syndromes, repetitive strain injuries, musculoskeletal injuries, and compressive neuropathies. Common injuries resulting in such usage include: carpal tunnel syndrome, wrist tendonitis, medial or lateral elbow epicondylitis, and rotator cuff muscle strains and tears. These disorders appear to be more common in the chronic crutch user, and are the result of repeated stresses on a particular musculoskeletal area. Thus, none of the traditional crutch constructions effectively support the users' body weight or torso in a comfortable manner so that they are able to walk using minimal energy with maximal comfort.

The following prior art references describe adjustable crutches, ergonomic cushions and hand grips and curved crutch tips. These prior art references, attempt to, but do not comprehensively solve the issues described above, and nor do these crutches provide ergonomic back support and spine decompression to a user who is seated. Further, these adjustable features of the prior art are generally to support storage the crutch after use. However, the adjustability of the invention facilitates a shorter support embodiment to support the user, while seated.

No other prior art has solved these problems this way and this efficiently.

Embodiments of the present invention generally relate to an orthopedic device to improve mobility and orthopedic support, while seated. More specifically, various embodiments of the present invention relate to multi-stage collapsible crutches that supports while both standing and seated.

Some of the prior art for the adjustable crutches are:

U.S. Pat. No. 8,844,548 teaches a walking aid support which includes an embodiment that comprises an oval shaped bottom and a downwardly angled slit. This support is configured facilitating walking and providing support in rough terrain.

U.S. Pat. No. 8,800,579 teaches an adjustable crutch designed to address three documented hazards or situations that may cause the crutch user to fall and injure themselves, however, it does not teach the support and amelioration of injuries to the underarm and hand, nor does it support the seated user.

U.S. Pat. No. 8,474,470 teaches an adjustable crutch designed to support an infirmed person's weight, while standing, but does not support the person's weight, while seated.

U.S. Pat. No. 8,418,704 teaches a power adjustable crutch assembly for assisting a user in transitioning between a seated position and a standing position. The assembly includes a support configured for positioning under an arm of a user. An upper frame is coupled to and extends downwardly from the support. A lower frame is in slide form coupled to the upper frame. An adjustment assembly is operationally coupled to the lower frame and the upper frame. It does not claim support for the user while seated, and as with most adjustable crutches, the adjustable characteristic is for ease of storage and/or usage in the standing position, not to support while seated.

U.S. Pat. No. 5,465,745, an adjustable crutch, includes upper and lower assemblies which are in slide format interconnected with one another and constructed of hollow aluminum pipes, or tubing, interconnected by glass or fiber-reinforced nylon members. The present invention has significantly more features to ensure the safety of the user and the three sliding members per staff allows the crutch to support the user in the seated position.

U.S. Pat. No. 7,360,547 is for a walking assist device which includes an elongate shaft having an adjustable length, a handle detachably connected to a proximal end of the elongate shaft, and a curved elongate base that mate to and engages a distal end of the elongate shaft.

U.S. Pat. No. 7,537,017 teaches a shoulder support assembly for an adjustable crutch. The shoulder support assembly is geared to solve many of the health issues connected to the usage of the standard crutch, but does provide adequate support, and it lacks the obvious advantages of a standard adjustable crutch.

Deficiencies of the embodiments in these prior art references documented above are their lack of ability to balance mobility, walking steadiness, support the back while seated, and prevent tripping.

US Patent Application 2013/0263901 teaches a handgrip for a crutch that, unlike the claimed design, is offset from the plane of the crutch in both forward and rear end of the grip.

U.S. Pat. No. 8,776,321 teaches an ergonomic hand grip that provides shock absorption and reduces fatigue. More specifically, the present technology is a hand grip of varying thickness to permit support, while also absorbing shock and vibration.

U.S. Pat. No. 8,950,415 teaches a crutch system pertaining to assembly and disassembly purposes, and the assembly and the disassembly of the crutch system adapted to be done in a simple, safe, rapid and economical manner.

So, no other prior art has solved these problems this way and this efficiently, as described below.

SUMMARY OF THE INVENTION

In one embodiment, a method and a device as an improvement for the traditional crutch and its usage is disclosed. The current invention has the design and function that far exceeds those of a traditional crutch/walking/sitting aid. It deals particularly with a more comfortable construction in crutch design. This invention is designed to provide help and relief for more effective ambulation and improved posture, for disabled as well as pre- and post-operative population, e.g., patients with chronic herniated or bulging discs.

The present invention provides for a crutch base that addresses three hazards of the typical crutch:

1) losing balance on a slippery surface caused by the tip sliding out from underneath;
2) hitting an object or an obstacle on the ground with the walker causing the user to continue in motion through inertia, while the walker is stopped by the obstacle; and
3) being restricted by the walker as the person moves forward or slips backward as he/she grabs onto the walker for support, but the walker is insufficiently flexible to move with the person. A first embodiment of the present invention is configured for persons with a relatively severe handicap and limited moving dexterity, generally unable to walk without a walking aid. This embodiment is configured for providing stability in bumpy or slippery walking terrains under a number of adverse situations that may occur. A second embodiment of the present invention is configured for use by persons who are not severely handicapped and use a walking aid, possibly for optional support, if, for example, one leg is sore or injured. Such a person would desire flexibility and only minimum movement restriction from the use of the walking aid.

The invention is also adjustable and allows the user to support his/her body weight in the seated position. This allows for more effective rest and reduces stress on the lumbar region. This is important and distinguishes this invention from the prior art. Using this design in the seated position elevates the upper body such that the user's upper body weight does add significant pressures to the lower back and spine. Thus, elevating and elongating the upper body reduces the pressure and stress to the lower body reducing the possibility of injury or worsening injuries, such as herniated discs and bulging discs, by decompressing the spine and alleviate upper body weight pressure on injured discs. The lower back is vulnerable to body weight pressures, while standing and seated, and this design minimizes those harmful pressures. This design also effectively supports the user's body weight/torso in a comfortable standing position so that the user is able to walk using minimal energy with maximal comfort.

In addition to supporting the user in ambulation and in the seated position, the design of the underarm cushion reduces stress and injury. This crutch cushion is designed to contour to shape of the axilla. The combination of the cushion form and special soft memory foam used in it minimizes potential underarm nerve injuries like neuropraxia, and even complete paralysis of the arm. The design also ensures that the pressing weight of the body is not directly on the axilla, thus minimizing the occurrence of muscle strain of the arms and shoulders, as well as joint pain to the shoulders.

Furthermore, the hand grip is contoured to fit a patient's palm and designed to maintain the hand and wrist in a neutral position when the crutches are in use or at a e.g. 5 to 25 degree angle during ambulation. The general construction and design of existing crutch hand grips does not provide the correct ergonomic orientation between the wrist and forearm, even though padding may be present. Failure to achieve correct alignment and padding in the palmar area can result in disorders of wear and tear, including overuse syndromes, repetitive strain injuries, musculoskeletal injuries, and compressive neuropathies. Common injuries resulting from such usage include: carpal tunnel syndrome, wrist tendonitis, medial or lateral elbow epicondylitis, and rotator cuff muscle strains and tears. These disorders appear to be more common in the chronic crutch user, and are the result of repeated stresses on a particular musculoskeletal area. Thus, this improved crutch design reduces injuries in ambulation, injuries to the hand through improved handgrips, and injures of the axilla, due to breathable gel and foam cushioning, and provides the user support and rest, while using the crutch, while seated.

DETAILED DESCRIPTION OF THE PREFERRED EMBODIMENTS

A method and various devices as improvements for the traditional crutch and its usage is disclosed. The current invention has the design and function that far exceeds those of a traditional crutch/walking/sitting aid. It deals particularly with a more comfortable construction in crutch design. This invention is designed to provide help and relief for more effective ambulation and improved posture, for disabled as well as pre- and post-operative population, e.g., patients with chronic herniated or bulging discs.

Figure 1:
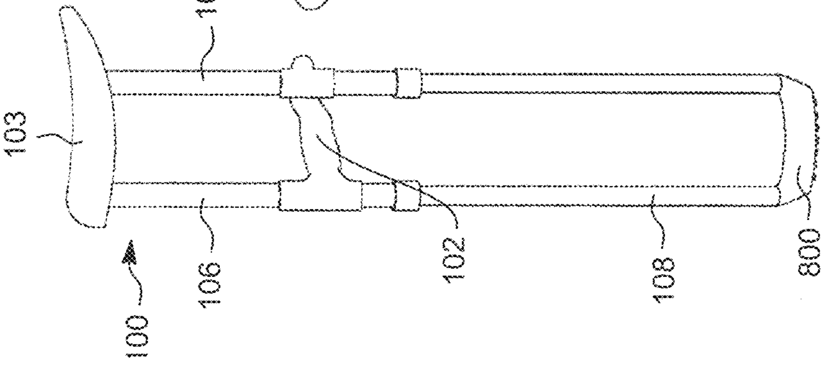
FIG. 1 shows a two-part detachable crutch with special ergonomic handle and cushion that is positioned toward the rear.
Figure 2:
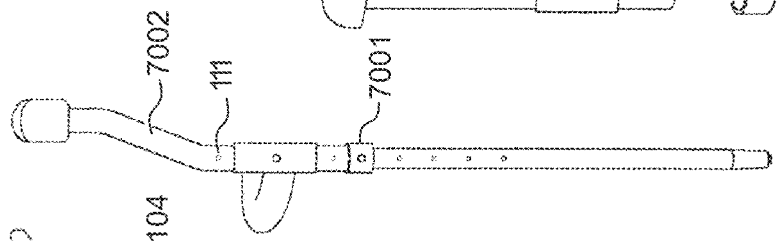
FIG. 2 shows a different design that has a curve in top segment of the crutch to provide more space between two crutches around the waist area for people with large/wide hip.

FIG. 1 shows a two-part detachable crutch 100 with a special ergonomic handle 102 and cushion 103 that sits or is positioned toward the rear 104. The top portion 106 can be slidably received in the bottom portion 108 with a fitting 110 which can be tightened to secure the relative positions of top and bottom in the well known manner. FIG. 2 shows a different design 111 that has a curve 7002 in the top part/segment 112 of the crutch to provide more space between two crutches around the waist area for people with large/wide hips.

Figure 3:
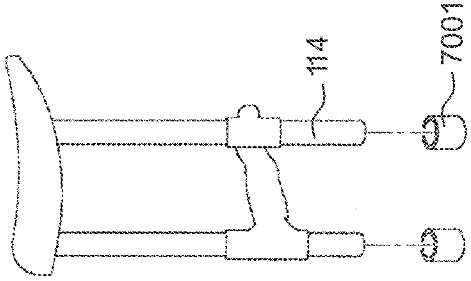
FIG. 3 shows two small caps which can be used after detaching the top part to prevent the bottom end pipes from piercing or denting the sitting surfaces.
Figure 4:
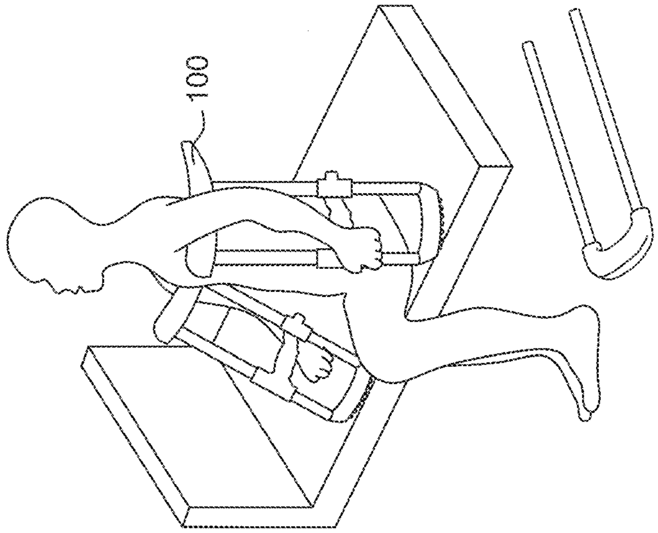
FIG. 4 shows a totally detachable crutch.

FIG. 3 shows two small caps 7001 which can be used after detaching the top part to prevent the bottom end pipes 114 from piercing/denting the sitting surfaces. FIG. 4 shows a user using the detachable crutch 100, 111 of FIGS. 2 and 3 in the sitting position, to stretch the upper body or decompression of back/spine, which is a secondary use of the crutch 100.

The pair of crutches 100, 111 are designed for usage in the sitting position, in addition to standing and walking positions. The crutches 100, 111 can adjust to about one third of the regular height in order to allow the user to use them in the sitting position to prop up their torso, therefore, it takes most of the upper body weight off the back and lower spine, in which it helps the user with back injury in sitting position. Each one of the crutches 100, 111 has two segments that telescopically slide into each other, in order to adjust to the height between a supporting sitting surface, such as chair, to the underarm or armpit of the user, while the user is in the sitting position.

This function helps patients with back or spine injury that are having a hard time to sit and encountering lots of pain, as all the upper body weight is bearing on lower injured back, while sitting. This function also creates a traction system in the sitting position, as the adjusted crutch pushes up the user's body/torso against the gravity force, which helps to reduce the spinal pressure over possible bulging discs and pinching nerves, which cause pain and numbness in the body, and also improves postural alignment while seated. The pair of crutches also have an ergonomic grip that eases the handling process and reduces the pressure on the wrist (and allows/encourages the user to distribute some of the weight on the handles, instead of leaving all the weight on the vulnerable under arm area).

Some of the features are as follows:

A pair of multi-functional crutches comprising of underarm cushions and three body segments which telescopically slide into each other to transform the regular crutch to a sitting crutch for patients who may have difficulty and pain, while sitting, due to the body weight pressure on the injured back and spine. It also has the new ergonomic handle design 500 which helps user to bear most of the user's weight on the palm of her hands, and not on her wrists.

The material and size of the system or apparatus described here can be widely diverse and different, e.g., made of wood, plastic, elastic, rubber, artificial materials, partially wool for cover (or fabric), glass, fiber glass, crystal, metal, alloy, carbon, carbon fiber, polymers, ceramic, transparent materials, translucent materials, glued materials, layered or stacked materials, or the like, and e.g., for sizes from about 0.25 ft as lower end of the range, to 6 ft, as upper range or values, in overall length and height, or from a few mm to a few inches for other dimensions for components and connections/connectors, in the images shown, just as examples. However, these numbers and materials are just examples, and not limiting the invention by any means, in spec or figures or for any purpose.

Figure 5:
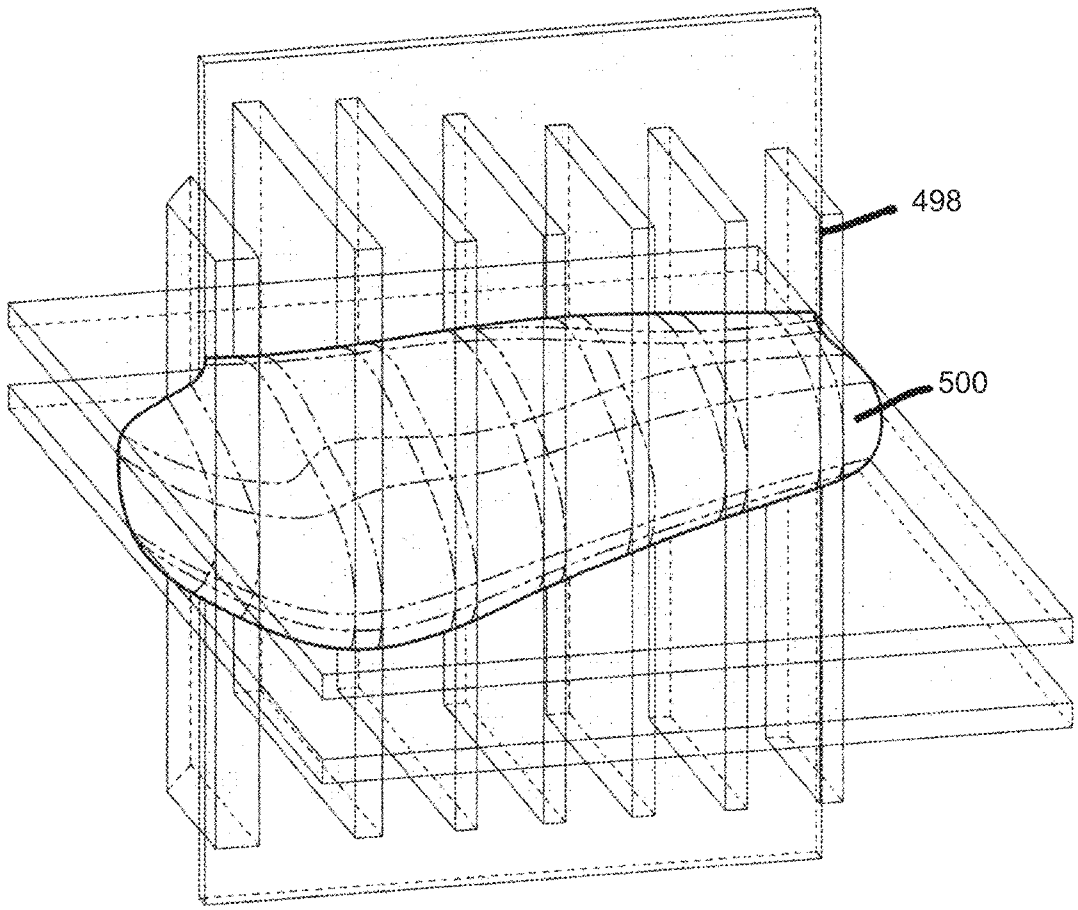
FIG. 5 shows a mold for creating an alternative embodiment of the handle.

FIG. 5 shows a mold apparatus exemplifying the method of forming a mold 498 and the subsequent handle 500 for a crutch produced thereby. The shape of the mold 498 is determined by creating, on a user by user basis preferably, an impression formed of a compressible molding material grasped by the intended user. A scan of the molding material formed by the user's hand impression is then taken and the digital results are used to create the handle 500. This is done for both the user's right and left hands.

FIGS. 6-11 show the handle 500 made as described above for a cane or crutch used in various settings. The handle 500 consists of two main parts: an inner ribbed structure 550 and an outer soft covering. The solid, ribbed material 550 in the core of the handle 500 provides a sturdy base for support and enables the overall mass and volume of the handle 500 to extend outward from the crutch 100, 111. It is composed of high-density acrylonitrile butadiene styrene (ABS), a material known for its toughness and impact resistance. The complexity of the inner structure 550 allows for adjusting the axis and angle to best match the arm and hand's natural posture.

The outer cover 552 (see especially FIG. 22) is composed of textured thermoplastic elastomer (TPE), which is both durable and pliant. Tough but supple, the TPE minimizes pressure to users' fingers. The handle's 500 much larger surface area provides more ergonomic support and a more comfortable hand rest.

The location and angle of the handle 500 within the overall crutch structure creates two unique aspects which allow better positioning of the hand. First, unlike conventional crutches, the ergonomic grip or handle 500 sits outside of the plane of the rest of the crutch 100. This location prevents the patient from twisting their hand and wrist inward and their elbow outward in order to hang onto the crutch. Second, the handle itself is set with a slight downward slope from back to front, akin to the natural angle of a person's first as it rests by their side. This keeps the patient from twisting their hand and wrist upward as they hold the crutch. Overall, the handle 500 is positioned so that the patient's hand and arm sit in a natural position as they hold the crutch 100.

Supportive Hand Rest

The shape of the handle 500 was designed to perfectly fit the shape of the hand. The molded fit allows the hand to maintain a natural shape when holding on to the handle, with even points of contact across the palm and all fingers. A flat, broad surface creates a wide plane for pressure distribution that does not put excess pressure on any one point in the hand. The longer handle also avoids hand and finger cramping and slipping that occurs with smaller, shorter handles that come with standard crutches. Softer material also helps to cushion the weight that is applied. The handle 500 is formed using molding material to form into the shape of the inside grip of the hand. This was scanned into a digital image to allow this shape to be perfectly replicated.

Figure 6:
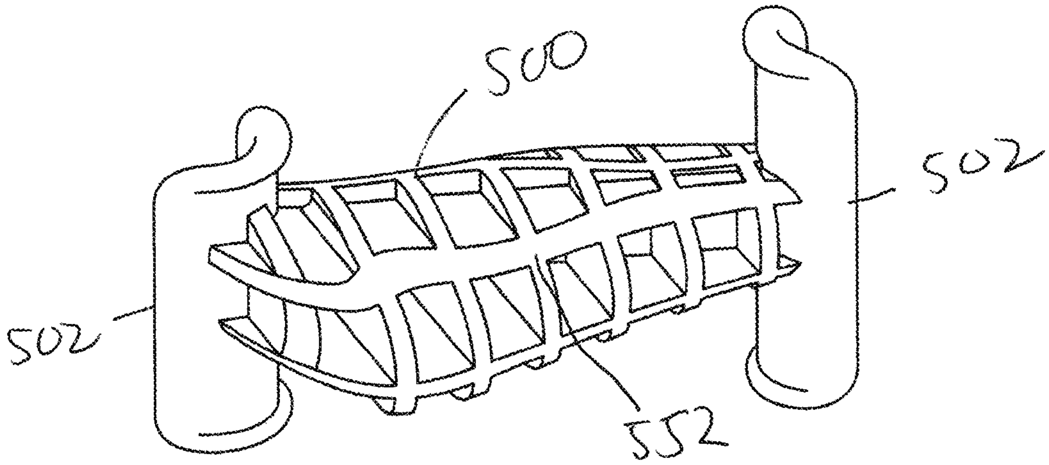
FIG. 6 shows a front perspective view of the handle of FIG. 5.
Figure 7:
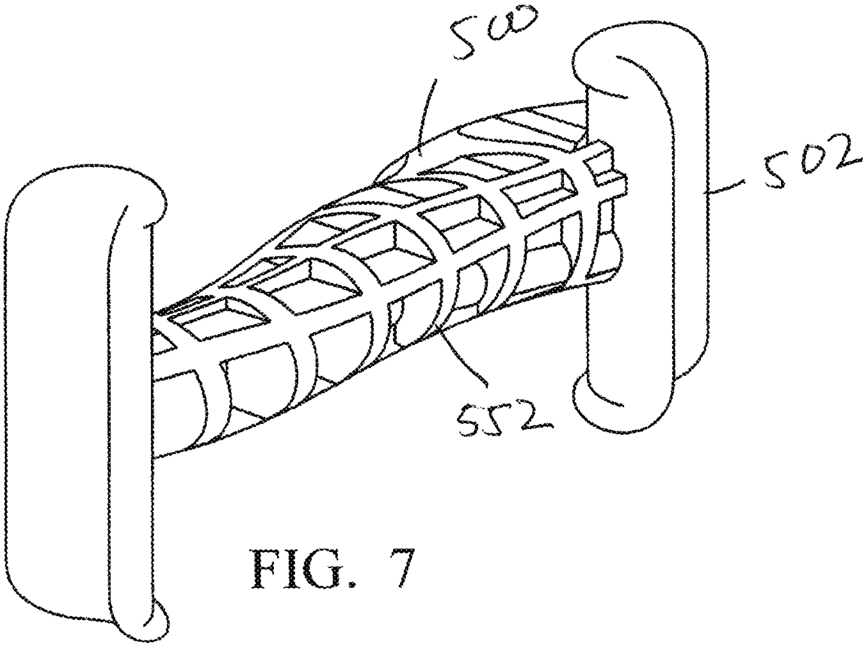
FIG. 7 shows a rear perspective view of the handle of FIG. 5.

FIG. 6 shows the structure of the new ergonomic handle 500 with special brackets 502 attached to the structure as one embodiment. The structure 552 between the two brackets is specifically designed to support the ergonomic shape of the handle 500. This new method helps with design challenges of proper and even ergonomic surface weight bearing support and shifting the weight bearing surface from main rod support in standard grips to outside of the rod support axis without losing the sufficient support needed in shifted weight bearing area. FIG. 7 is the same as FIG. 6 from a different angle.

Figure 8:
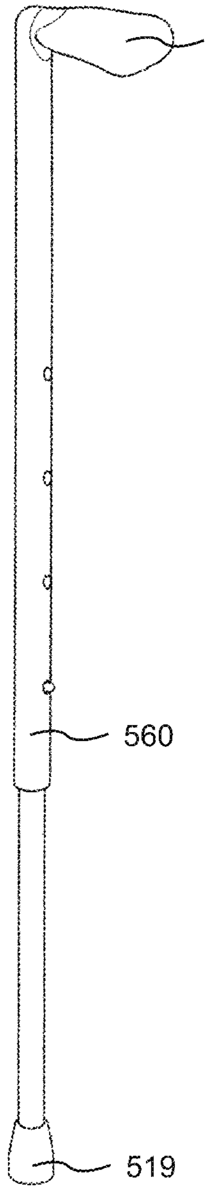
FIG. 8 shows an alternative embodiment of a cane formed in accordance with the invention.

FIG. 8 shows a cane 560 designed with the handle 500. The upright support can be made from any material and color. The tip 519 (bottom elastic part) can be removed and replaced with another tip optimized for a particular surface as will be discussed in more detail later. The height of the cane 560 is adjustable.

Figure 9:
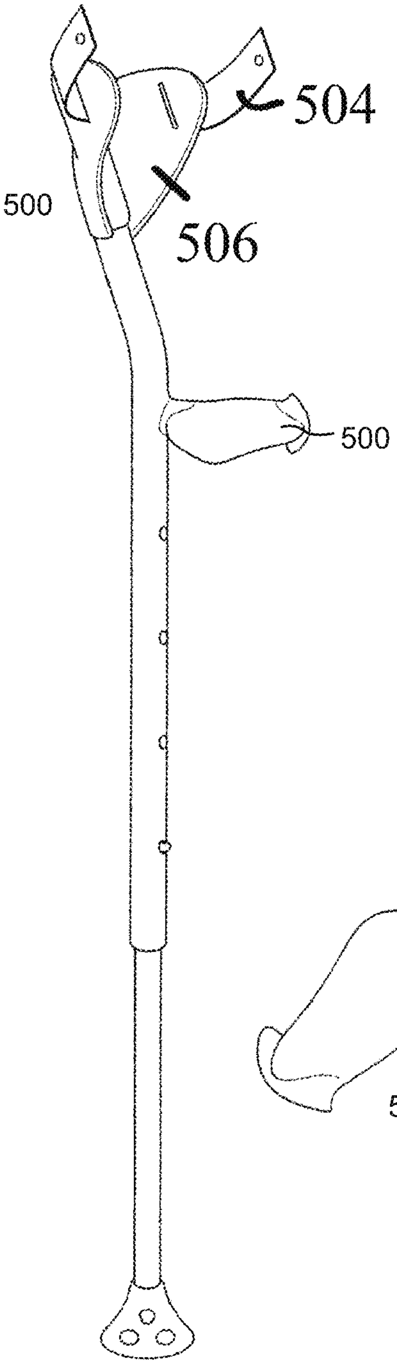
FIG. 9 shows an alternative embodiment of a forearm crutch formed in accordance with the invention.

FIG. 9 is a forearm crutch with the inventive handle 500. Two straps 504 adjacent to each side of the cuff 506 which can wrap around the user's arm while placed in the cuff and come together in the front and connect by any means such as buttons or another fastening arrangement to secure the forearm crutch to the arm of the user. Also, if the user needs to free their hand and let go of the grip for activities such as opening a door, the strap 504 will hold the crutch to their arm and prevent from falling onto the ground or need of fetching the crutch again.

Figure 10:
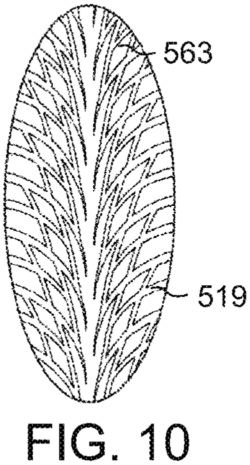
FIG. 10 shows an alternative embodiment of a rubber tip for a cane formed in accordance with the invention.

FIG. 10 shows a tread pattern 563 for the cane or crutch tip 519 which allows for greater traction on slippery surfaces.

Figure 11:
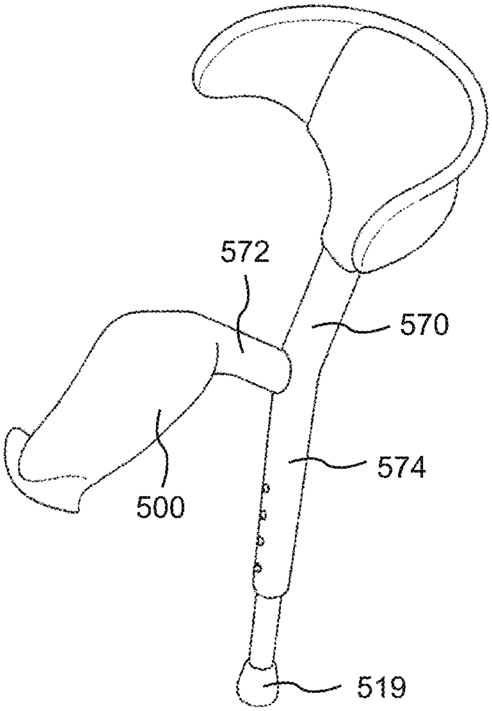
FIG. 11 shows an alternative embodiment of yet another forearm crutch formed in accordance with the invention.

FIG. 11 shows a different forearm crutch design 570 where there is a horizontal support 572 with a diagonal axis coming out of the upright support 574 and bearing to the right. The handle 500 is then bearing to the right. This new design helps with positioning the user's hand according to the natural human hand position to prevent strains and damages on carpal and other parts of the hand and arm.

Figure 12:
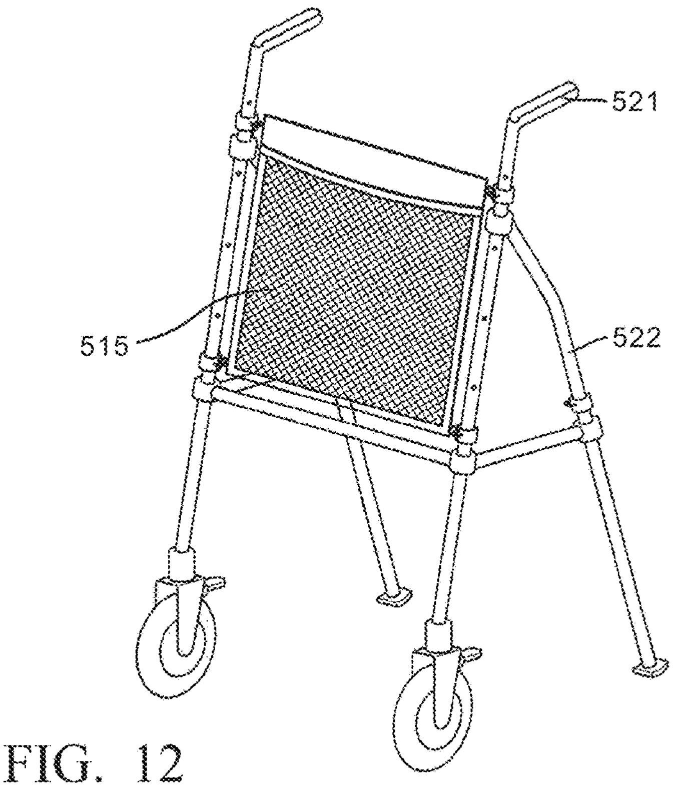
FIG. 12 shows a walker having a storage pouch attachment.
Figure 13:
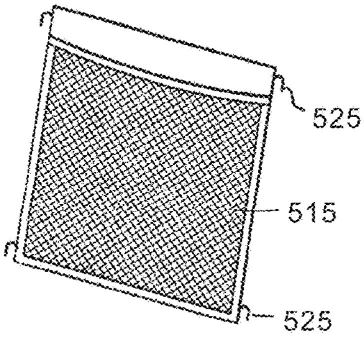
FIG. 13 shows the storage pouch attachment.

Referring now to FIGS. 12-18 a first embodiment of a multifunctional cane/crutch ambulatory assistance apparatus is shown. The apparatus 520 replaces the front support and handle of a walker 522. In the position (closed position) shown in FIG. 12 it provides additional height to the handle 521 of the walker 522 to prevent the user from slouching that happens with standard walkers, and keep the body straight during ambulation to prevent other side effects of unnatural position and strains on shoulders, arm and spines. FIG. 12 also shows a multipurpose pouch/seat 515 with a rectangular solid frame and four hooks 525 in each corner (FIG. 13). The hooks 525 are hooked into the small hoops 527 on each of four clips secured on the walker supports. This position secures the pouch 515 vertically in order to place any belonging into the pouch to keep them handy for the user during the use of the walker 522.

FIG. 13 shows the multifunctional pouch/seat 515. The pouch 515 could include one or more pockets to support and hold items such as phone, wallet, pen, pad, etc. when is installed in vertical position. This pouch 515 can be used as a seat of the walker 522 when unhooked from the two top hoops 527 and then hooked to the two hoops 527 in the back supports. Once this change is done the pouch 515 can function as a seat for the user to take a sit on it and rest as needed.

Figure 14:
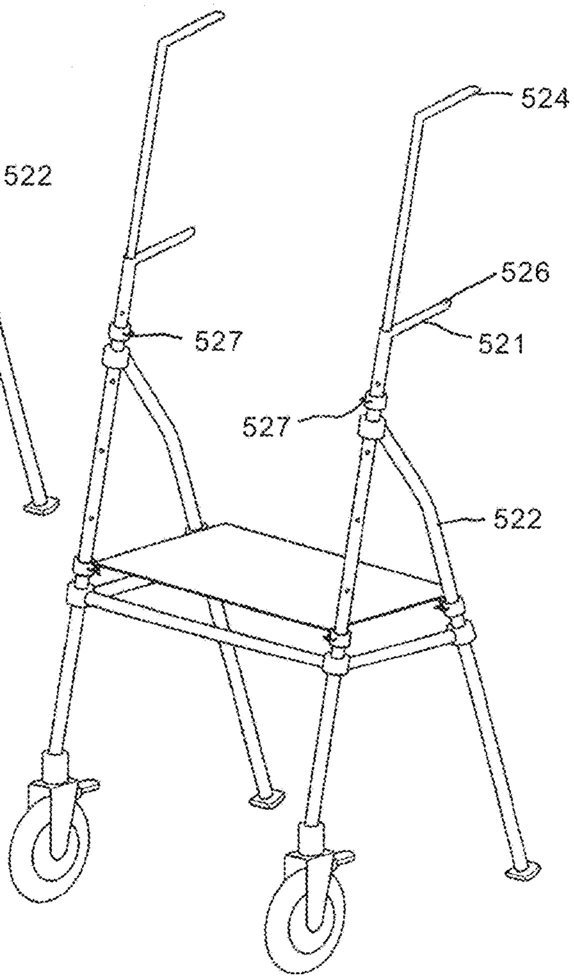
FIG. 14 shows a walker using a telescoping crutch as a replacement handle in accordance with another aspect of the invention.

FIG. 14 shows the two parts crutch as the front upright of the walker 522 in opened position. In this position the user can take advantage of the second function in which is a combination of handle for a hand grip and an under arm crutch to alleviate the user weight pressure and strains over the shoulders, arms, wrist, hand and spine. This function turns two points support of two hand grips seen on a standard walker to four point support consisting of two hand grip supports and two underarm supports at the same time. The small lever in the front wheels can lock the wheel so it prevents the walker 522 from moving as needed in the well known manner.

Figure 15:
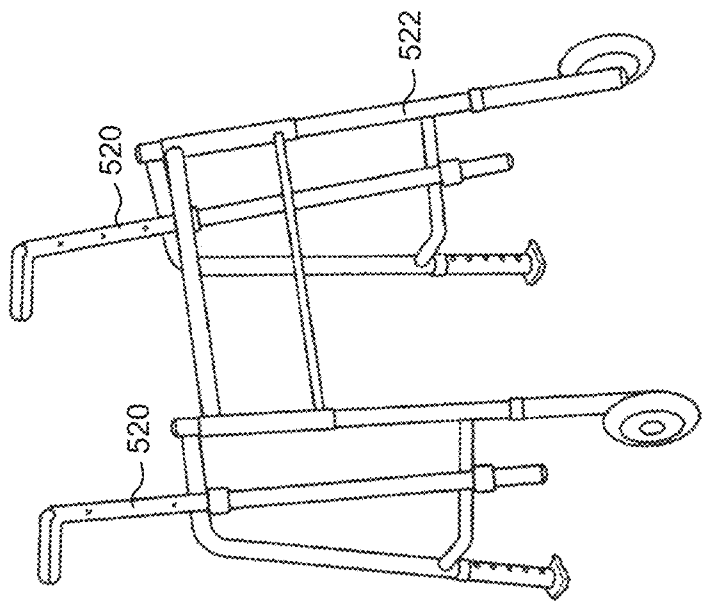

FIG. 15 is an example of conventional walker 522 which has two multifunctional canes 520. The inventive cane/ambulatory assistance device 520, can be used as a conventional cane but in accordance with one embodiment of the invention is attached to right and left sides of the walker which turns a conventional walker 522 to a multi-functional one. This design has many advantages including:

a) Adjustable height for the walker handle to prevent slouching;
b) Can be detached to be used as a cane;
c) Can be opened as shown in FIG. 14 to provide handles and underarm crutch with four points of body support.

Figure 16:
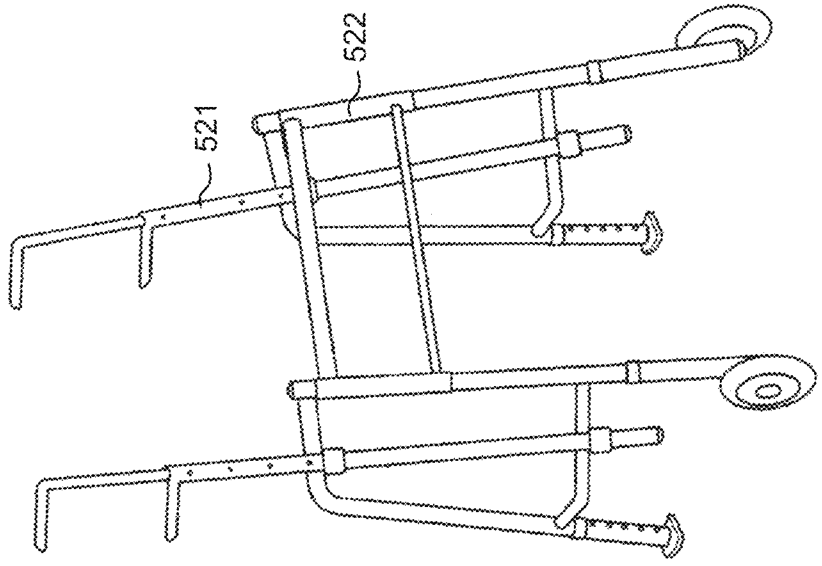
FIGS. 15 and 16 show a walker modified using the crutch shown in FIG. 14.

FIG. 16 shows the open position of the cane 520 that provides two points of hand grip support for right and left hand in addition to extra two points support of underarm crutch.

Figure 17:
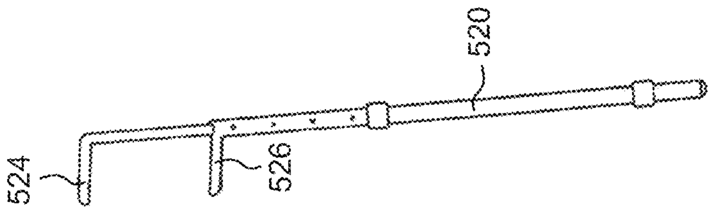
FIG. 17 shows the crutch used for modifying the walkers.

FIG. 17 shows the multifunctional ambulation device 520 by itself in open position in which is this position can be used as a crutch. However when closed can be used as a cane, or when is installed on a walker can be used as an adjustable handle.

Figure 18:
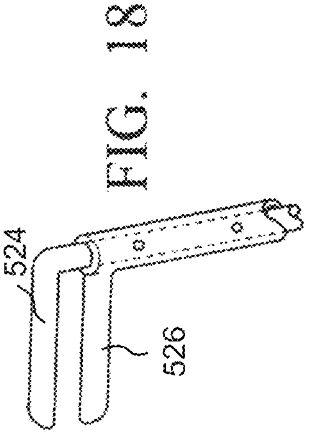
FIG. 18 shows a detail of FIG. 17.

FIG. 18 showing a detail of the two parts 524, 526 of the multifunctional device 520 which can move relative to each other and adjust inside of the main support telescopically, that is adjacent to the upper half of the handle 521 when the core support is pulled out of the body the adjacent top half 524 of the handle separates form the bottom half 526. Once the top part 524 is completely pulled out as shown in FIG. 17, the top 524 of the handle can be placed under arm as an underarm support while the bottom part of the handle 526 stays in the same place and can be used as a handle or grip.

Figure 19:
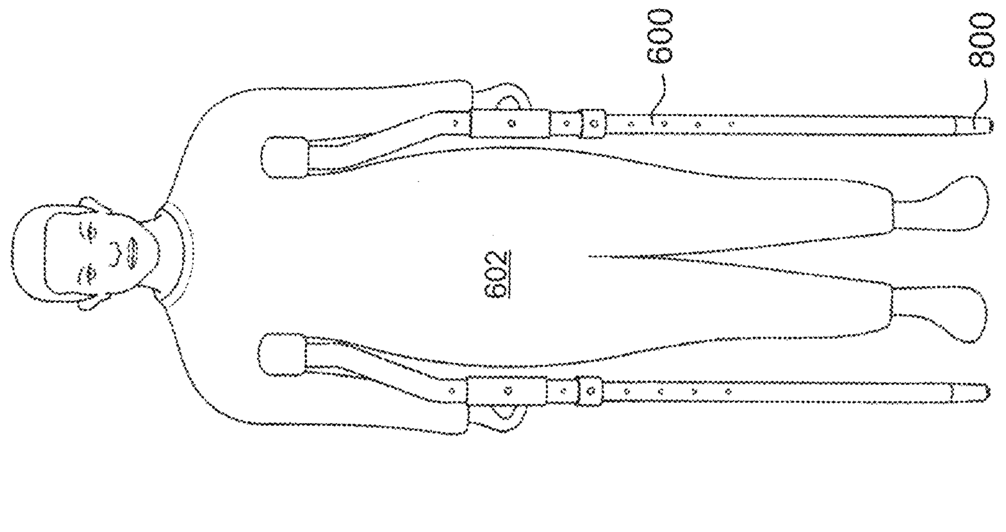

FIG. 19 shows a crutch 600 designed for obese or people with larger hip to prevent unsafe angles of crutch positioning to the ground. This will allow the user 602 with abnormal body form to keep the crutch 600 close to the body and perpendicular to the ground therefore creating a more upright position which prevents slip of the crutch 600 to the sides and provides more secure ambulation. This crutch 600 also can be designed and produced with different curvature to accommodate the different hip size or specific body shape of a person. Both crutches 100, 600 have top 610 and bottom 612 sections with the top 610 slidably receivable within the bottom.

Figure 20:
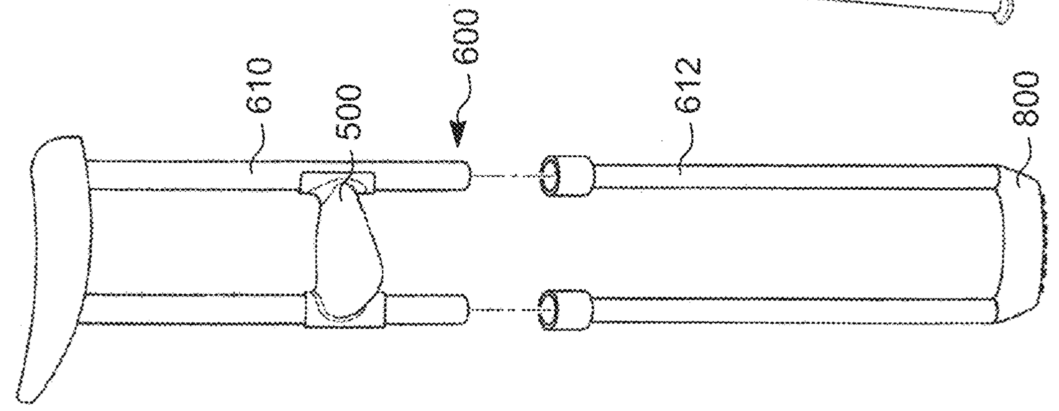
FIGS. 19-20 show another crutch embodiment.

FIG. 20 shows the crutch 600 modified so the top part 610 of the crutch can be installed on a walker 522, in order to create four points of support; two handle and two underarm supports for the user.

Figure 21:
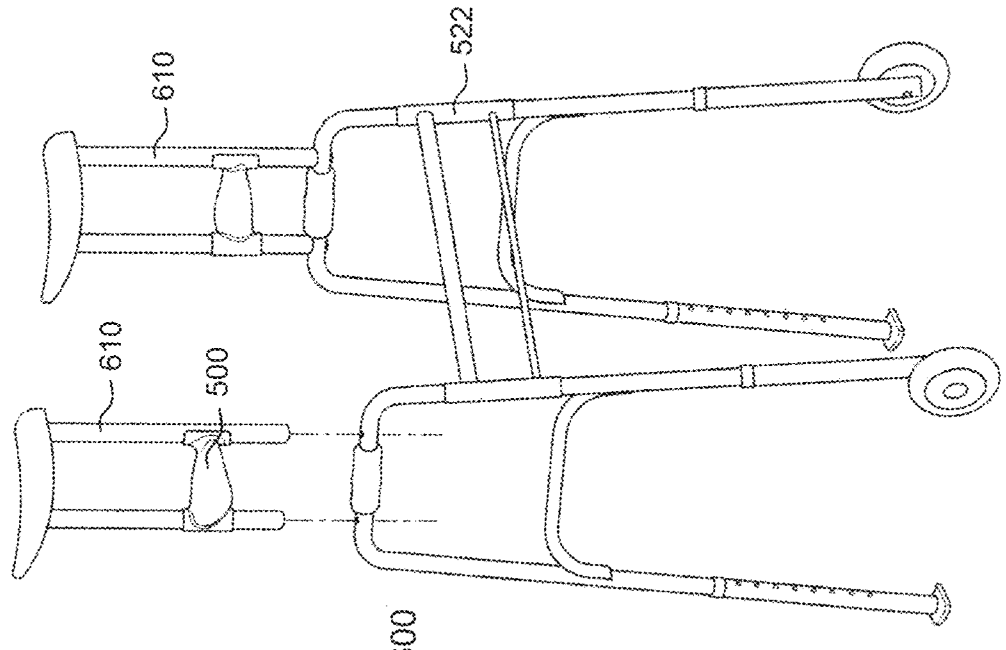
FIG. 21 shows the crutch of FIGS. 19-20 used with a walker.

FIG. 21 shows the top part of the crutch 600 separated and installed on a walker 522 in order to create four points of support; two handle and two underarm supports for the user.

Figure 22:
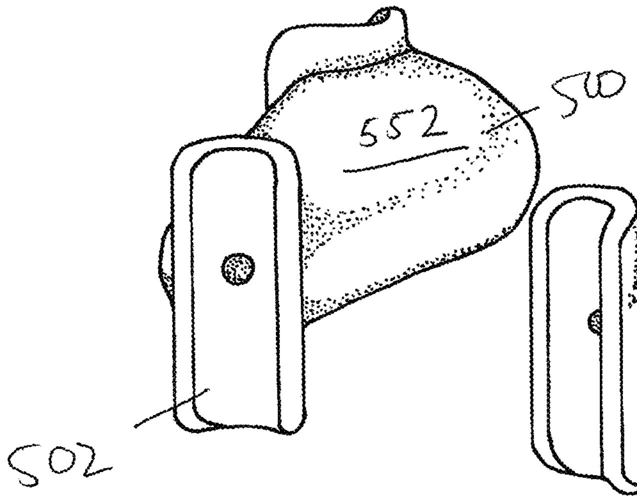
FIGS. 22 and 23 show the completed handle of FIGS. 6 and 7.
Figure 23:
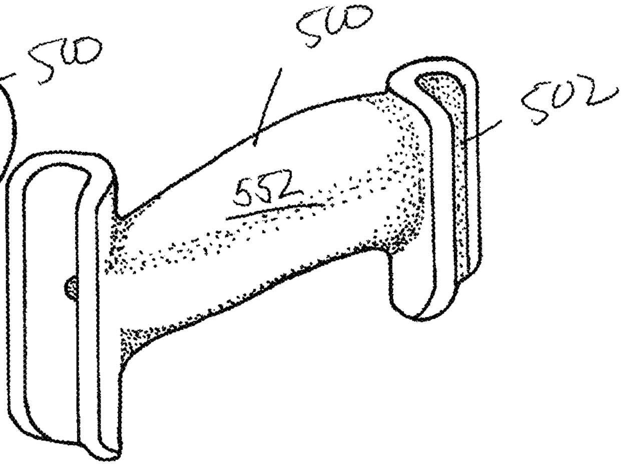

FIGS. 22 and 23 show the handle 500 after a flexible and cushion overmold that can be made of gel or TPE or any other elastic or cushion material is installed on it to create the utmost comfort by providing a natural position for human hand while using any kind.

Figure 24:
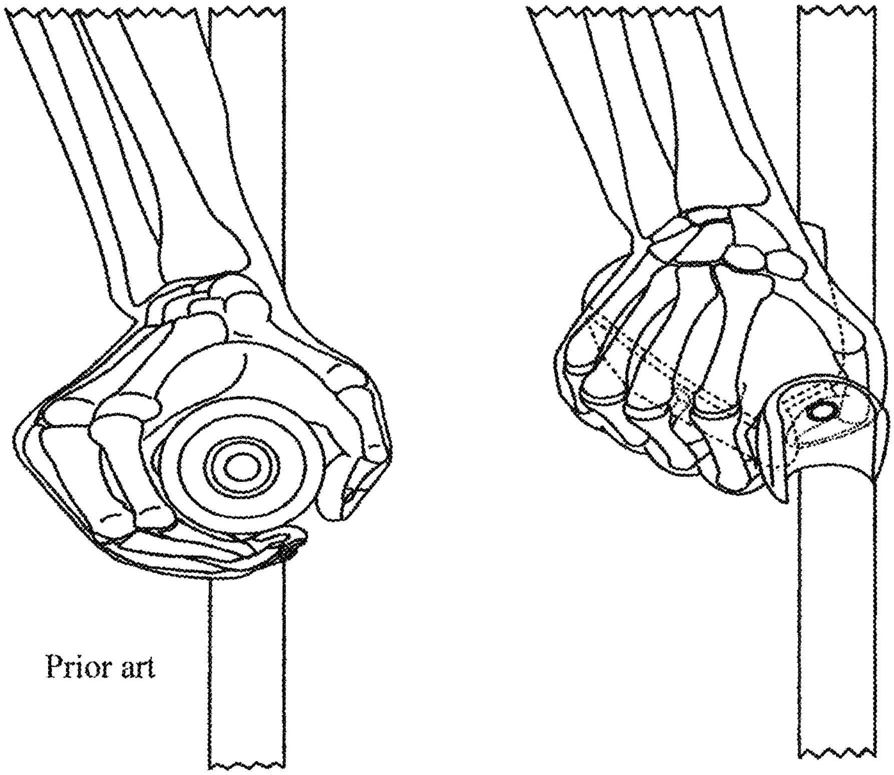
FIG. 24 shows a comparison of user stress using the handle of the invention and a prior art handle.
Figure 25A:
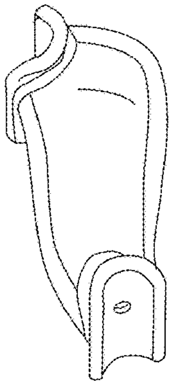
FIG. 25A-25H show several completed handles made using the mold illustrated in FIG. 5.
Figure 25B:
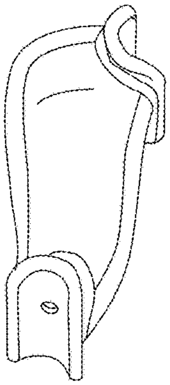
Figure 25C:
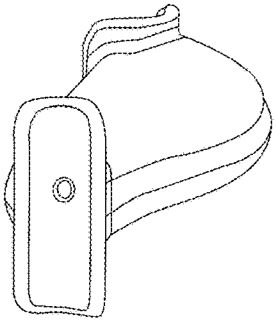
Figure 25D:
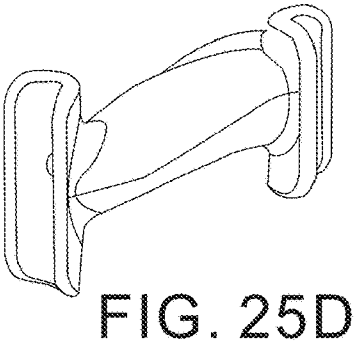
Figure 25E:
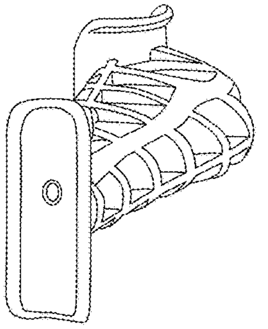
Figure 25F:
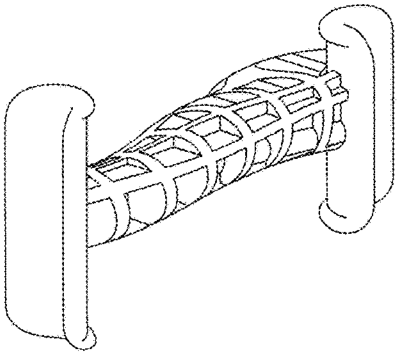
Figure 25G:
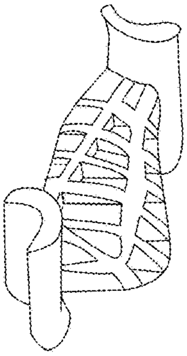
Figure 25H:
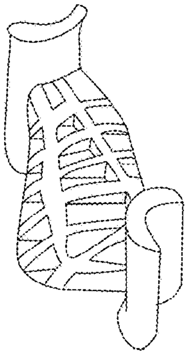
Figure 26:
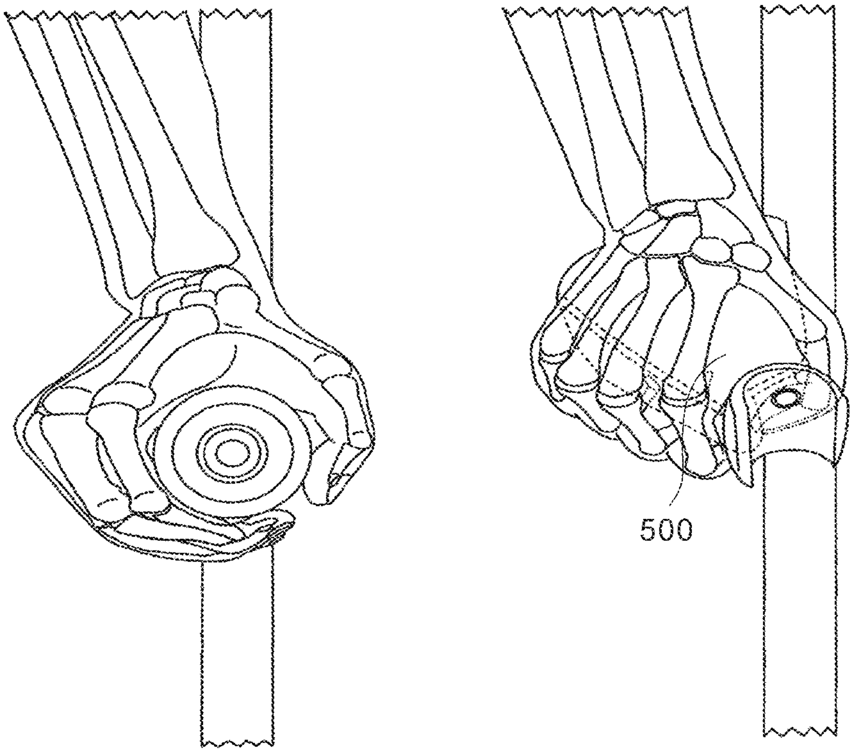
PRIOR ART FIG. 26
FIG. 26 shows another comparison of user stress using the handle of the invention and a prior art handle.
Figure 27:
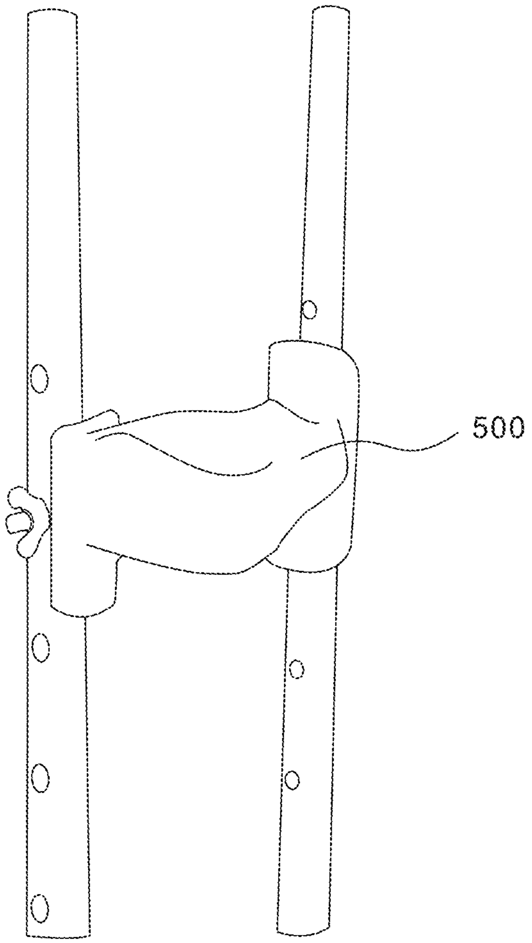
FIG. 27 shows the handle formed in accordance with the inventive method used on a crutch.

FIGS. 24 and 26 show a comparison of the stresses on the 10 user's hand of the handle 500 of the invention versus a conventional handle on the right side of the illustration. Stresses are highlighted by shading and broken lines, so it can be seen that the conventional grip produces more stress than the handle 500 of the invention because of the angling and contouring of the handle 500 as explained in detail above. FIGS. 25A-25H show the various shapes possible using the inventive molding technique as described above. FIG. 27 shows the handle 500 in use on a standard crutch.

Figure 28:
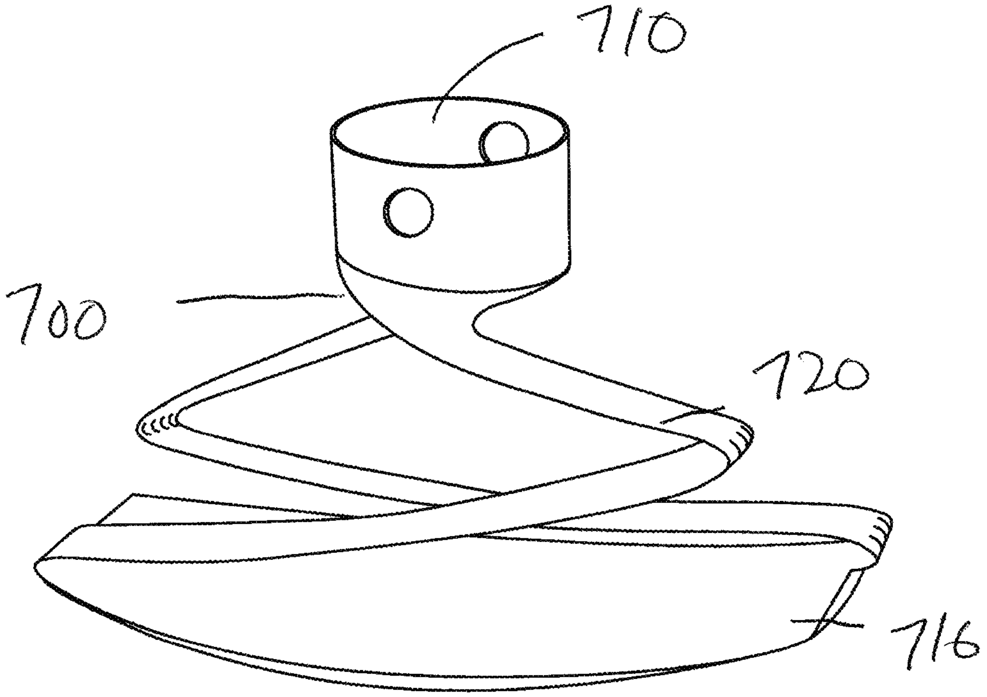
FIG. 28 shows a perspective view of a shock absorbing tip for a crutch/cane.
Figure 29:
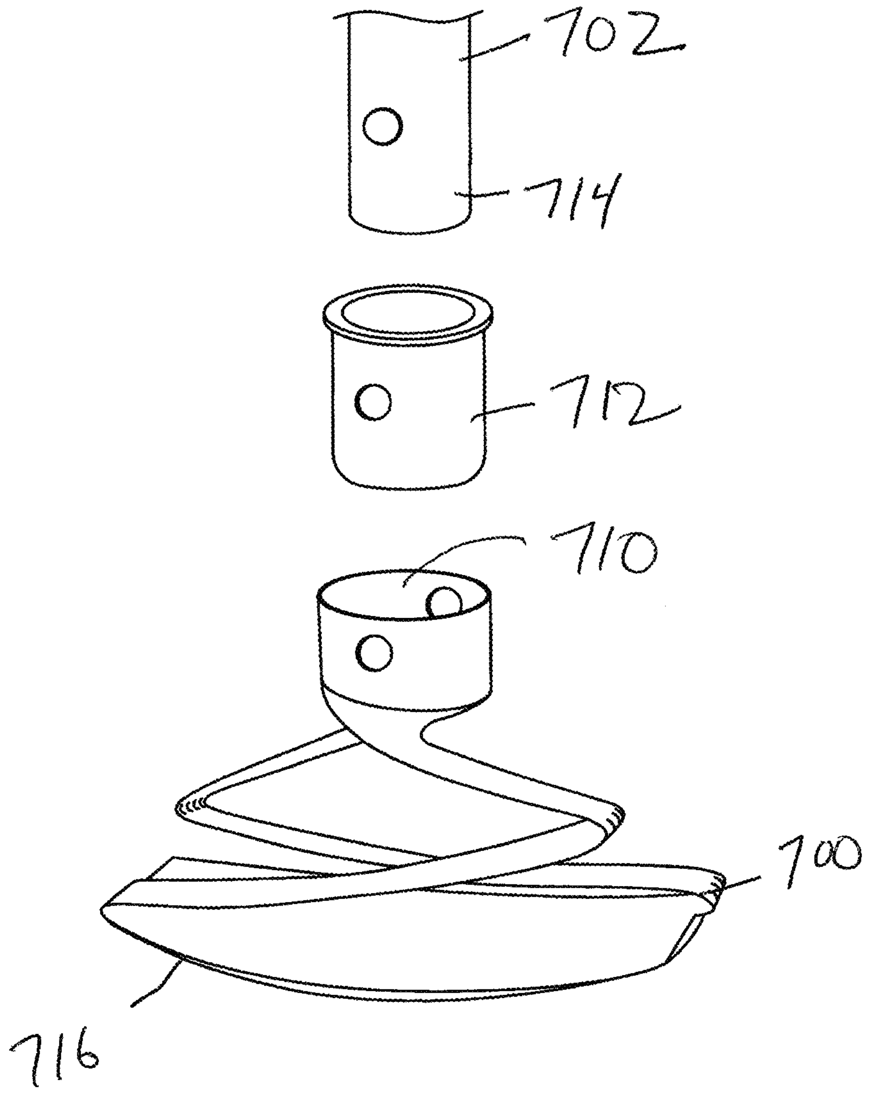
FIG. 29 shows the tip of FIG. 28 used on a cane.
Figure 30:
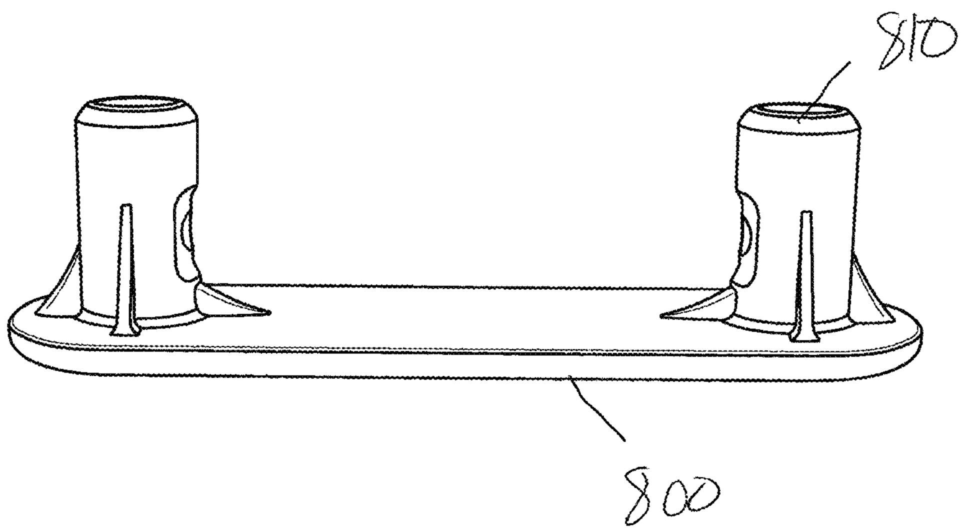
FIGS. 30 and 31 show a base of a crutch that can be used for walking on various non-paved surfaces.
Figure 31:
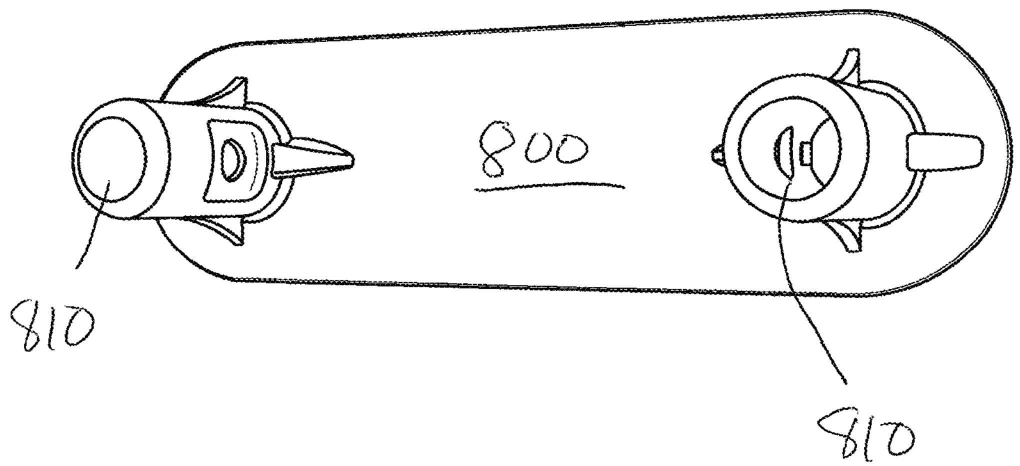

FIGS. 28 and 29 show a spring loaded tip 700 for a cane 702. The tip 700 has an opening 710 for receiving a fitting 712, the fitting 712 sized to receive the bare end 714 of the cane 702. The base 716 has a broad footprint so as to ease walking on uneven or porous surfaces such as dirt, sand, or grass/vegetation. The spring portion 720 is in the form of a living hinge arrangement which allows weight transfer in rolling fashion from front to back. This action distributes loading on impact with the walking surface to reduce shock which reduces carpal tunnel syndrome and other undesirable effects of high impact ambulation.

Referring now to FIGS. 30, 31, 1, and 20 a base 800 for the top 610 or bottom 612 of crutch 100, 600 is shown. The base 800 can be used with the top 610 portion to facilitate the exercises as discussed above in conjunction with FIGS. 1-4. The base 800 includes two receiving sockets 810 for receiving the vertical supports of the crutch 100, 600.

Any variations and any combinations of the above teachings are also intended to be covered by this patent application.

What is claimed is:

1. A hand grip for a crutch system, said crutch system including at least front and rear vertical support poles extending downwardly to ground from an armpit rest, said front and rear poles positioned within a first vertical plane, the hand grip comprising:

a main body having a ribbed core positioned between opposing end portions, a first end portion connected to said front support pole and a second end portion connected to said rear support pole, said hand grip having a curved profile so that a middle portion of said hand grip has an outer edge that lies outside of the plane of said front and rear support poles on a first side, said middle portion wider than said end portions;

said middle portion having a top surface extending between said outer edge and an inner edge, wherein the inner edge does not extend outside the plane of the poles on a second side opposite the first side, said main body sloping downwardly from said rear to said front vertical support pole;

wherein at least a part of the middle portion lies outside of the first vertical plane and said end portions lie within said first vertical plane.

2. The hand grip of claim 1 wherein the curved profile is adjusted in curvature in response to measurement from a user.

3. The hand grip of claim 1 wherein said ribbed core is composed of high-density acrylonitrile butadiene styrene (ABS).

4. The hand grip of claim 1 wherein said main body has a front portion and a rear portion, said front portion terminating at said first end portion and said rear portion terminating at said second end portion;

said front and rear portions both extending angularly outwardly from said vertical plane to form said curved profile.

5. The hand grip of claim 1 wherein said hand grip has a non-rectangular cross section.

6. A hand grip for a crutch system, said crutch system including at least front and rear vertical support poles extending downwardly to ground from an armpit rest, said front and rear poles positioned within a first vertical plane, the hand grip comprising:

a main body with opposing end portions, with a middle portion positioned between said end portions, a first end portion connected to said front support pole and a second end portion connected to said rear support pole, said hand grip having a curved profile so that the middle portion of said hand grip is widened to have an outer edge that lies outside of the plane of said front and rear support poles on a first side;

said widened middle portion having a top surface extending between said outer edge and an inner edge, wherein the inner edge does not extend outside the plane of the poles on a second side opposite the first side, said main body sloping downwardly from said rear to said front vertical support pole;

wherein at least a part of said widened middle portion lies outside of the first vertical plane, and said end portions lie within said first vertical plane.

7. The hand grip of claim 6 wherein the curved profile is adjusted in curvature in response to measurement from a user.

8. The hand grip of claim 6 wherein said hand grip is formed of a ribbed core composed of high-density acrylonitrile butadiene styrene (ABS).

9. The hand grip of claim 6 wherein said main body has a front portion and a rear portion, said front portion terminating at said first end portion and said rear portion terminating at said second end portion;

said front and rear portions both extending angularly outwardly from said vertical plane to form said curved profile.

10. The hand grip of claim 6 wherein said hand grip has a non-rectangular cross section.

* * * * *